Patented Apr. 13, 1954

2,675,376

UNITED STATES PATENT OFFICE 2,675,376

AZOIC DYESTUFFS OF THE BENZOTRIAZOLE SERIES

Mario Scalera, Somerville, and Frederic Henry Adams, Bound Brook, N. J., assignors to American Cyanamid Company, New York, N. Y., a corporation of Maine No Drawing. Application September 27, 1951, Serial No. 248,655

9 Claims. (Cl. 260—157)

This invention relates to a new series of azo coloring matters having the following formula:

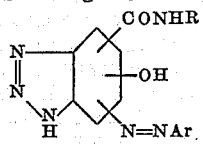

in which R is a carbocyclic aromatic radical, the CONHR group being ortho to the hydroxy group and Ar is the radical of a diazotizable amine.

The dyestuffs of the present invention show a wide variety of attractive shades, particularly browns and tans. It is an advantage of the present invention that they are prepared by the ordinary process of coupling diazotized amines with arylides having the formula

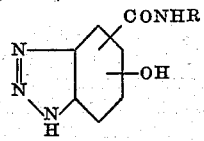

In general, any of the ordinary diazotized amines may be used. A few typical amines include aniline, toluidines, anisidines and phenetidines, sulfanilic acid, naphthionic acid, 4-chloro-2-methylaniline, alpha- and beta-naphthylamine, 1-naphthylamine-6-sulfonic acid 1-naphthylamine-4,8-disulfonic acid, benzidine, dianisidine, 5-chloro-2-methoxyaniline, 2-chloro-5-aminotoluene-4-sulfonic acid and the like. The coupling reactions proceed smoothly and require no special precautions.

The invention will be illustrated in greater detail in conjunction with the following specific examples, the parts being by weight unless otherwise specified. Since the arylides themselves are new chemical compounds, their preparation is described in separate examples. However, the present application does not claim the arylides as new chemical compounds or their methods of production. This constitutes the subject matter of our copending application, Serial No. 248,656, filed September 27, 1951.

Example 1

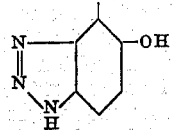

5-hydroxy-1,2,3-benzotriazole-4-carboxylic acid

A nickel lined, steel autoclave is charged with an intimate mixture of 20 parts of 5-hydroxy-1,2,3-benzotriazole, 95.5 parts of anhydrous potassium carbonate, and 115 parts of solid glass beads. The mixture is heated in the autoclave with open vent for 6 hours at 150–165° C., and then under 600 lbs. of carbon dioxide for 16 hours at 180–190°. The contents of the autoclave are then dissolved in 600 parts of water, decanted from the glass beads, heated at 50° with 5 parts of charcoal and 5 parts of siliceous filter aid, and filtered. The product separates on acidification. It can be purified by solution in sodium hydroxide followed by acidification to pH 6, filtration, and charcoal decolorization. On strong acidification the product separates and may be filtered and recrystallized from water. It melts at approximately 210° C. It couples with diazotized p-nitraniline in acid solution to give a bright reddish-orange product, and in alkaline solution to give a reddish-violet product.

Example 2

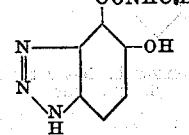

5-hydroxy-1,2,3-benzotriazole-4-carboxylic anilide

A solution of 2.55 parts of the above prepared 5-hydroxy-1,2,3-benzotriazole-4-carboxylic acid in 110 parts of chlorobenzene is dried by distilling out 5 parts of solvent, treated with 1.89 parts of aniline, and cooled to 70° C. There is then gradually added at this temperature a solution of 0.85 part of phosphorus trichloride in 50 parts of chlorobenzene. The mixture is heated to 130–135° C., and the reaction completed by refluxing until evolution of hydrogen chloride ceases. The resulting solution is cooled to room temperature, filtered, and extracted with aqueous sodium hydroxide. The product separates on acidification and is filtered. If desired, it can be crystallized from alcohol, and melts at approximately 188° C.

This arylide couples in alkaline solutions with diazotized p-nitroaniline to give a dark reddish-brown dye, soluble in caustic alkali and reprecipitated by acetic acid. Diazotized 2,5-dichloroaniline gives an alkali-soluble brownish-orange dye.

Example 3

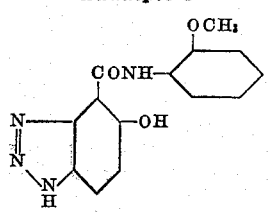

5-hydroxy-1,2,3-benzotriazole-4-carboxylic-o-anisidide

This compound is prepared in excellent yield from o-anisidine by the procedure described above for the anilide. It may be crystallized from alcohol. The pure material melts at approximately 213° C.

Example 4

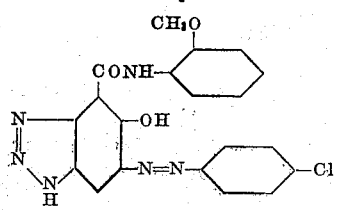

p-Chloroaniline (2.6 parts) is diazotized in the ordinary way with hydrochloric acid and sodium nitrite, and added with stirring to a solution of 6.0 parts of the above prepared 5-hydroxy-1,2,3-benzotriazole-4-carboxy-o-anisidide in 400 parts of water, 40 parts by volume of molar sodium hydroxide and 20 parts by volume of molar sodium carbonate solution. During this operation, more sodium carbonate is added as necessary to maintain alkalinity to phenolphthalein. The brown dye which is produced is acidified, filtered, washed, and dried at 100°.

Example 5

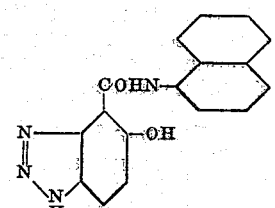

5-hydroxy-1,2,3-benzotriazole-4-carboxylic alpha-naphthylamide

Prepared by the above described procedure, and crystallized from alcohol, this product melts at approximately 214° C.

Example 6

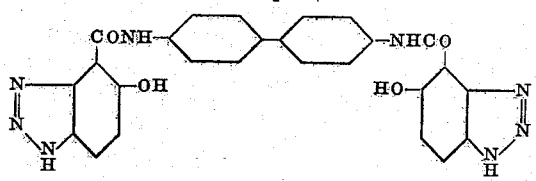

5-hydroxy-1,2,3-benzotriazole-4-carboxylic benzidide

This product is prepared by the above described procedures. It shows no melting point up to 300° C.

Example 7

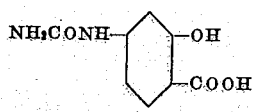

4-ureidosalicylic acid

A solution of 16 parts of 4-aminosalicylic acid in 50 parts of water and 24 parts of 5 N sodium hydroxide solution is treated with 8.1 parts of potassium cyanate, and stirred until solution is complete. The resulting solution is cooled to 10–15° C., and carefully acidified with 5 N hydrochloric acid. The resulting thick white precipitate is heated to boiling to redissolve, treated with charcoal, filtered, cooled, and further acidified by additional hydrochloric acid. The product is filtered, and may be recrystallized from water. It melts at approximately 209° C.

Example 8

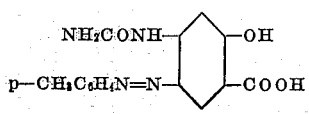

5-(p-tolylazo)-4-ureidosalicylic acid

A solution of 38.6 parts of p-toluidine in 234 parts of 5 N hydrochloric acid and 500 parts of water is diazotized in the normal way at 2–3° C. with 5 N sodium nitrite solution. The resulting diazo solution is added with stirring to a solution of 84.5 parts of the above prepared 4-ureidosalicylic acid in 800 ml. of water and 260 parts of 5 N sodium hydroxide, additional sodium hydroxide being added as necessary to maintain strong alkalinity. The reaction mixture is diluted with 500 parts of water, acidified to pH 3 with hydrochloric acid after completion of the coupling, and filtered. The brown dye obtained is dried at 50° C.

Example 9

5-amino-4-ureidosalicylic acid

To 1000 parts of water and 118 parts of 5 N sodium hydroxide at 60° C., there is added 44.3 parts of the above prepared 5-(p-tolylazo)-4-ureidosalicylic acid and 50 parts of sodium hydrosulfite. The mixture is heated to 80° until practically colorless, held at this temperature approximately one-half hour longer, filtered hot, cooled to 30°, and washed with toluene. Removal of the p-toluidine is completed by adding to the aqueous solution 24 parts of 5 N sodium hydroxide solution, and repeating the toluene extraction. The washed solution is then cooled to 5° C. and acidified to precipitate the white product. The yield can be increased somewhat by salting. The product melts with decomposition in the range 235–240° C., charring at lower temperatures.

Example 10

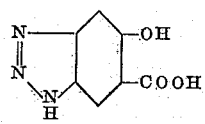

5-hydroxy-1,2,3-benzotriazole-6-carboxylic acid

A solution of 4.2 parts of the above prepared 5-amino-4-ureido-salicylic acid in 100 parts of water and 30 parts of 5 N sodium hydroxide is treated with 16 parts of 5 N hydrochloric acid to precipitate the starting material in finely divided form. The resulting slurry is cooled to 10° C. and treated with approximately 150 parts of 0.1 N sodium nitrite solution, which is added as fast as it reacts. When the reaction is complete, as evidenced by a permanent excess of nitrite, the precipitate is filtered and dried. If desired, it may be purified by boiling with an equal weight of decolorizing charcoal in 100 times its weight in water, filtering, and acidifying with dilute hydrochloric acid. This material does not melt but gradually decomposes at temperatures in the range of 280° C. It couples with diazotized p-nitraniline in acid solution to give a yellowish-orange product, and in alkaline solution to give a deep bluish-violet product.

Example 11

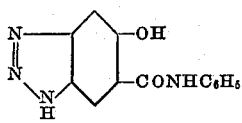

5-hydroxy-1,2,3-benzotriazole-6-carboxylic anilide

The procedure described above is followed, using 490 parts of dry chlorobenzene, 13.5 parts of aniline, and 17.9 parts of 5-hydroxy-1,2,3-benzotriazole-6-carboxylic acid. An excellent yield of product is obtained. It may be purified by dissolving in hot dilute caustic, treating with decolorizing charcoal, filtering, and acidifying. It decomposes at approximately 253° C.

Example 12

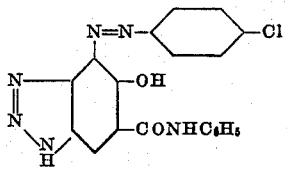

p-Chloroaniline (10.4 parts) is diazotized in the ordinary way with hydrochloric acid and sodium nitrite and added with stirring to a solution of 21.6 parts of the above prepared 5-hydroxy-1,2,3-benzotriazole-6-carboxyanilide in 1600 parts of water, 80 parts by volume of molar sodium carbonate solution, and 160 parts by volume of molar sodium carbonate solution. Additional sodium carbonate is added as necessary to maintain alkalinity to phenolphthalein. When coupling is complete, the resulting deep brown solution is acidified, and the brown dyestuff filtered, washed, and dried at 100°.

Example 13

(R-2921-14)

A solution is prepared from 50 parts of the above prepared 5-hydroxy-1,2,3-benzotriazole-6-carboxylic anilide, 200 parts of alcohol, 350 parts of 5 N caustic soda, and 9500 parts of water. The resulting solution is used to pad 500 parts of cotton yarn, which is then wrung out and divided into 2 equal parts. One of the resulting skeins is developed by immersion in a bath containing 100 parts of the zinc chloride double salt of diazotized 3-nitro-4-aminoanisole in 10,000 parts of water. The resulting dyeing is reddish brown. The second skein is dyed an orange-brown shade in a similar way from the zinc chloride stabilized diazo of 2,5-dichloroaniline.

The following table gives the shades of other dyeings made by the same technique:

| Coupling Component | Diazo Component | Shade |
|---|---|---|
| 1. 5-hydroxybenzotriazole-4-carboxylic anilide. | 3-nitro-4-aminoanisole | Reddish tan. |
| 2. 5-hydroxybenzotriazole-4-carboxylic anilide. | 2,5-dichloroaniline | Yellowish tan. |
| 3. 5-hydroxybenzotriazole-4-carboxylic alphanaphthylamide. | 3-nitro-4-aminoanisole | Reddish tan. |
| 4. 5-hydroxybenzotriazole-4-carboxylic alphanaphthylamide. | 2,5-dichloraniline | Yellowish tan. |
| 5. 5-hydroxybenzotriazole-4-carboxylic benzidide. | 3-nitro-4-aminoanisole | Orange-brown. |
| 6. 5-hydroxybenzotriazole-4-carboxylic benzidide. | 2,5-dichloroaniline | Orange-tan. |
| 7. 5-hydroxybenzotriazole-4-carboxy o-anisidide. | 3-nitro-4-aminoanisole | Reddish brown. |
| 8. 5-hydroxybenzotriazole-4-carboxy o-anisidide. | 2,5-dichloroaniline | Yellowish brown. |

We claim:
1. An azo dyestuff of the formula:

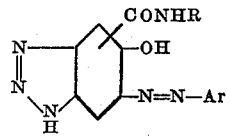

in which R and Ar are carbocyclic aromatic radicals.

2. An azo dyestuff of the formula:

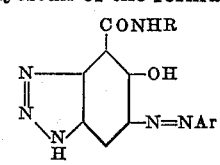

in which R and Ar are carbocyclic aromatic radicals.

3. An azo dyestuff of the formula:

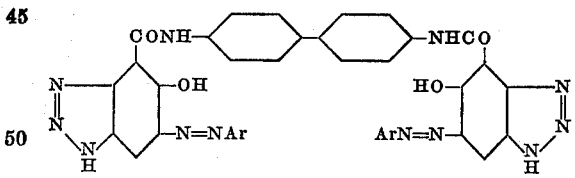

in which Ar is a carbocyclic aromatic radical.

4. An azo dyestuff of the formula:

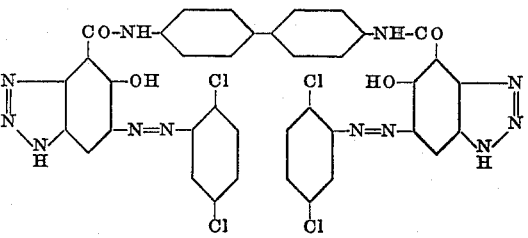

5. An azo dyestuff according to claim 2 in which R and Ar belong to the benzene series.

6. An azo dyestuff of the formula:

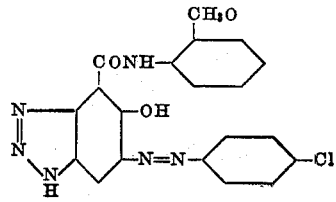

7. An azo dyestuff of the formula:
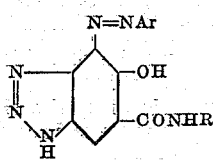
in which R and Ar are carbocyclic aromatic radicals.
8. An azo dyestuff according to claim 7 in which both Ar and R are mononuclear.
9. An azo dyestuff of the formula:
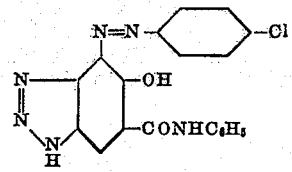
References Cited in the file of this patent
UNITED STATES PATENTS
| Number | Name | Date |
|---|---|---|
| 2,308,023 | Peterson | Jan. 12, 1943 |
| 2,346,531 | Allen et al. | Apr. 11, 1944 |
| 2,448,870 | Dickey et al. | Sept. 7, 1948 |